United States Patent
Xing et al.

(10) Patent No.: US 8,498,465 B2
(45) Date of Patent: Jul. 30, 2013

(54) ACCURATE DETERMINATION OF THE SHAPE AND LOCALIZATION OF METALLIC OBJECT(S) IN X-RAY CT IMAGING

(75) Inventors: Lei Xing, Palo Alto, CA (US); Jing Wang, Plano, TX (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 420 days.

(21) Appl. No.: 12/924,327

(22) Filed: Sep. 23, 2010

(65) Prior Publication Data

US 2011/0075911 A1      Mar. 31, 2011

Related U.S. Application Data

(60) Provisional application No. 61/277,917, filed on Sep. 29, 2009.

(51) Int. Cl.
*G06K 9/00* (2006.01)

(52) U.S. Cl.
USPC .......................................... 382/131; 382/270

(58) Field of Classification Search
USPC .................................. 382/128, 131, 173, 270
See application file for complete search history.

(56) References Cited

U.S. PATENT DOCUMENTS

| 6,125,193 A * | 9/2000 | Han .............................. 382/131 |
| 2011/0075899 A1 * | 3/2011 | Kunze et al. .................. 382/128 |

* cited by examiner

*Primary Examiner* — Andrew W Johns
(74) *Attorney, Agent, or Firm* — Lumen Patent Firm

(57) ABSTRACT

A binary image reconstruction method is provided to identify metal objects in a computer tomography (CT) image. The method includes providing a suitably programmed computer, providing a CT image, where the CT image includes intensity data, and the suitably programmed computer is used to determine a first range of attenuation coefficient values and a second range of attenuation coefficient values in the intensity data, where when a difference between the first range of attenuation coefficient values and the second range of attenuation coefficient values is less than a pre-determined gradient threshold value, a boundary of a metal object in the CT image is determined.

4 Claims, 6 Drawing Sheets

100

(a)

(b)

(c)

(a)

(b)

(c)

ACCURATE DETERMINATION OF THE SHAPE AND LOCALIZATION OF METALLIC OBJECT(S) IN X-RAY CT IMAGING

CROSS-REFERENCE TO RELATED APPLICATIONS

This application claims priority from U.S. Provisional Patent Application 61/277,917 filed Sep. 29, 2009, which is incorporated herein by reference.

STATEMENT OF GOVERNMENT SPONSORED SUPPORT

This invention was made with Government support under contracts W81XWH-08-1-0127 awarded by the U.S. Army Medical Research Acquisition Activity and CA104205 awarded by the National Institutes of Health. The Government has certain rights in this invention.

FIELD OF THE INVENTION

The present invention relates generally to devices and methods for medical imaging. More specifically, it relates to methods for locating metallic object(s) in CT imaging.

BACKGROUND OF THE INVENTION

The presence of metals in a patient, such as a dental filling, a hip prosthesis, an implanted marker, applicators used in brachytherapy, and surgical chips, may cause streaking artifacts in X-ray CT and has been long been recognized as a problem that limits the applications of CT imaging. In the last three decades, many efforts have been devoted to reduce metal artifacts in CT. There are two types of techniques. One is first to identify the metal-contaminated region in the projection space and then replace them by using different interpolation schemes, such as linear interpolation, multi-resolution interpolation or variational method based on the un-contaminated projection data. CT images are then reconstructed from the completed projection data by analytical filtered back-projection (FBP)-type algorithms. In reality, identification of a metal object in the projection is not always easy, especially when the object is behind a high-density structure such as the bone. Alternatively, metal artifacts are reduced by using a model-based iterative reconstruction algorithm which are advantageous in modeling the image formation and incorporating a prior knowledge. A major shortcoming of the existing iterative algorithms is that, the knowledge about the shape and location, and sometimes even the attenuation coefficients, of the metal objects are required to ensure the effective removal of the metal artifacts. In reality, however, knowing this information before reconstruction is a very strong, and often impractical, assumption to impose, and makes iterative algorithms not useful for general clinical applications.

Because accurate localization of metals in CT images is a critical step for metal artifacts reduction in CT imaging and many practical applications of CT images, what is needed is a method capable of auto-identifying the shape and location of metallic object(s) in the image space.

SUMMARY OF THE INVENTION

To address the needs in the art, a binary image reconstruction method is provided to identify metal objects in a computer tomography (CT) image. The method includes providing a suitably programmed computer, providing a CT image, where the CT image includes intensity data, and the suitably programmed computer is used to determine a first range of attenuation coefficient values and a second range of attenuation coefficient values in the intensity data, where when a difference between the first range of attenuation coefficient values and the second range of attenuation coefficient values is less than a pre-determined gradient threshold value, a boundary of a metal object in the CT image is determined.

According to one aspect of the invention, the determination of the attenuation coefficient ranges includes applying a penalized weighted least squares (PLWS) criterion to minimize an objective function, where the objective function includes a data fidelity term and a regularization term, where the regularization term characterizes an a priori attenuation coefficient of the intensity data. In one aspect, the regularization term is only applied for adjacent data elements having a gradient value smaller than a predetermined threshold value, where when the regularization term is applied to the CT image having metal object data or tissue data. Thus a reconstructed output image shows only a metal object and a masked patient structure background.

In another aspect of the invention, the first range of attenuation coefficient values is assigned a value of 0 and the second range of attenuation coefficient values is assigned a value of 1, where a region in the CT image in which the assigned values change from 0 to 1 at a boundary of a metal object in the CT image.

DETAILED DESCRIPTION

Figure 1:
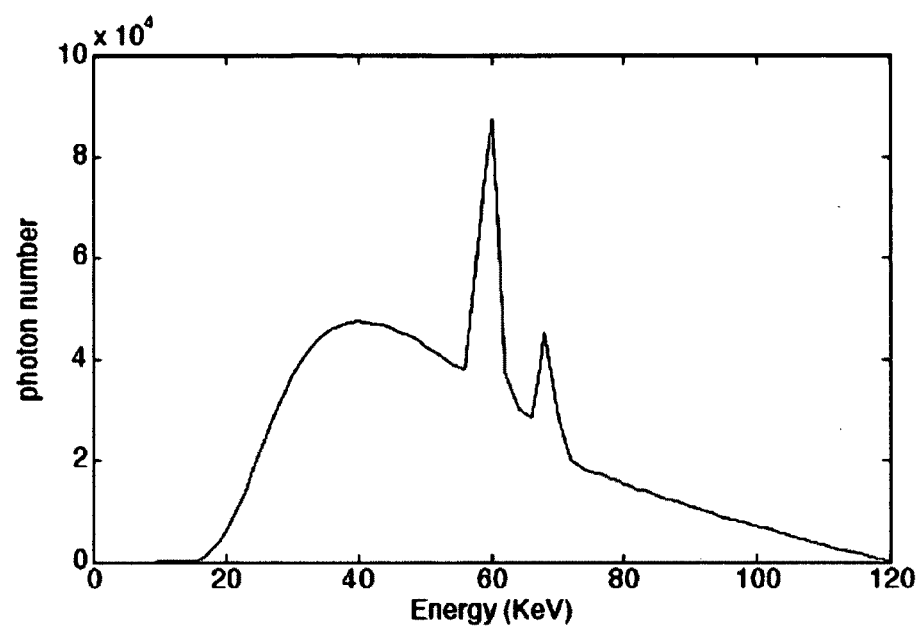
FIG. 1 shows a diagram of an incident x-ray spectrum assumed in the simulation study, according to one embodiment of the invention.

The method according to the current invention operates because a metal object is present in a patient allows a CT image to be divided into two prominent components: high-density metal and low-density normal tissues. This prior knowledge is incorporated into an objective function as the regularization term whose role is to encourage the solution to take a form of two intensity levels. The objective function is minimized by using a Gaussian-Seidel iterative algorithm.

According to one embodiment of the invention, an image intensity gradient threshold-based method for auto identifying the shape and location of metallic object(s) in the image space is provided. Because a full-fledged iterative algorithm to obtain the tissue and metal density distribution simultaneously does not completely remove the artifacts due to the incompleteness of the projection data, two separate but related steps are provided by the method of the invention.

First, a binary image of the patient is obtained that is reconstructed in such a way that the high-density metals possess a "density" 1 and the remaining regions 0 with any anatomic detail ignored, using a suitably programmed computer. An edge-preserving iterative algorithm is applied to obtain the binary image by effectively utilizing the enormous difference in attenuation coefficients of metal(s) and the surrounding tissues and bones. The obtained geometric information of the metal objects is by itself valuable for many clinical applications, such as the localization of the implanted seeds and intracavitary applicator for accurate dose calculation and planning in brachytherapy. In one aspect of the invention, the information can be incorporated in iterative image reconstruction algorithms to more reliably reconstruct the images with substantially reduced artifacts.

According to the invention, in the presence of a metal object, the linear attenuation coefficient at the boundary of the metal changes suddenly, and the detection of the metal boundary is equivalent to processing a signal with sharp edge. This is different from conventional CT reconstruction, where the focus is to derive the density distribution within the field of view and is often challenged due to missing reliable projection signals behind the metal objects, here the method of the current invention estimates a binary image. Mathematically, reconstruction of such an image is much more manageable because the issues associated with missing data is eliminated. According to one embodiment, the project data at provided is sufficient to define the metal boundary within the patient.

According to the current invention, there are a number of embodiments for processing of piece-wise continuous signals using a suitably programmed computer. In one embodiment, the image intensity threshold-based method is used to identify the metal objects. An image can generally be divided into two prominent components and the task here is to find the boundary between the high and low-density regions from the projection data. An iterative image reconstruction algorithm based on the penalized weighted least-squares (PWLS) criterion is implemented to accomplish the goal. In this algorithm, CT images are reconstructed through minimizing an objective function, which includes two terms: a data fidelity term and a regularization term. The regularization term characterizes a priori property of the system and its role is to preserve the sharp edge between the high and low-density regions and to encourage the smoothness within each density region. The difference of the linear attenuation coefficient between metal and normal structures is usually much larger than that between different non-metal structures. The method of the current invention is practical because the regularization term is only applied for the neighbors of which the gradient is smaller than the pre-selected threshold. By setting a proper gradient threshold, the regularization term is applied within the metal objects or normal tissues, and the reconstructed image contains only the metal object having a background with masked patient structure information.

Mathematically, the PWLS criterion can be written as $$\Phi(\mu)=(\hat{p}-A\mu)'\Sigma^{-1}(\hat{p}-A\mu)+\beta R(\mu) \quad (1)$$

The first term in equation (1) is the weighted least-squares criterion and symbol ' denotes the transpose operator. $\hat{p}$ is the vector of log-transformed projection measurements and $\mu$ is the vector of attenuation coefficients to be reconstructed. The dimension of $\hat{p}$ is the total number of measured projection data and the dimension of $\mu$ is the total number of voxels in the reconstructed images. The projection data $\hat{p}$ and the attenuation map $\mu$ is related by $\hat{p}=A\mu$, where A represents the projection matrix and its elements $a_{ij}$ is the length of the intersection of projection ray i with pixel j. $\Sigma$ is a diagonal matrix with i-th element of $\sigma_i^2$, i.e., an estimate of the variance of measured $\hat{p}_i$ at detector bin i which can be estimated from the measured projection data according to a mean-variance relationship of projection data. The second term in equation (1) is a prior constraint, where $\beta$ is the parameter which controls relative contribution from the measurement and the prior constraint. The attenuation map $\mu$ is estimated by minimizing the objective function (1) using the Gauss-Seidel updating strategy.

The prior constraint in equation (1) enforces a roughness penalty on the solution. The quadratic penalty with equal weights for neighbors of the same distance has been used for iterative image reconstruction:

$$R(\mu) = \mu' R\mu = \frac{1}{2}\sum_j \sum_{m \in N_j} w_{jm}(\mu_j - \mu_m)^2; \quad (2)$$

where index j runs over all image elements in the image domain, $N_j$ represents the set of neighbors of the j-th image pixel. The parameter $w_{jm}$ is set to 1 for the first-order neighbors and $1/\sqrt{2}$ for the second-order neighbors in previous applications. This type of penalty only takes distance information of the neighbors into account. Thus the edges are smoothed in the image reconstructed using this isotropic quadratic penalty.

For metal boundary reconstruction, we design a special quadratic penalty term in equation (2) by introducing a gradient-controlled parameter $c_{jm}$. The form of the new penalty is expressed as:

$$R(\mu) = \mu' R\mu = \frac{1}{2}\sum_j \sum_{m \in N_j} c_{jm} w_{jm}(\mu_j - \mu_m)^2, \quad (3)$$

where $$c_{jm} = \begin{cases} 0 & |\mu_j - \mu_m| \geq \delta \\ 1 & |\mu_j - \mu_m| < \delta. \end{cases} \quad (4)$$

By introducing the parameter $c_{jm}$, the regularization is only applied for the neighbors of which gradient is smaller than the threshold $\delta$.

An exemplary 2D simulation phantom is provided to demonstrate the accuracy of the algorithm according to the current invention. The background material of the phantom is water and soft tissue. Several metallic objects, including iron, brass, and aluminum, are inserted into the phantom. A graph or the spectrum of the x-rays 100 employed in the simulation is shown in FIG. 1, which is discretized into 1 keV bins.

Figure 2:
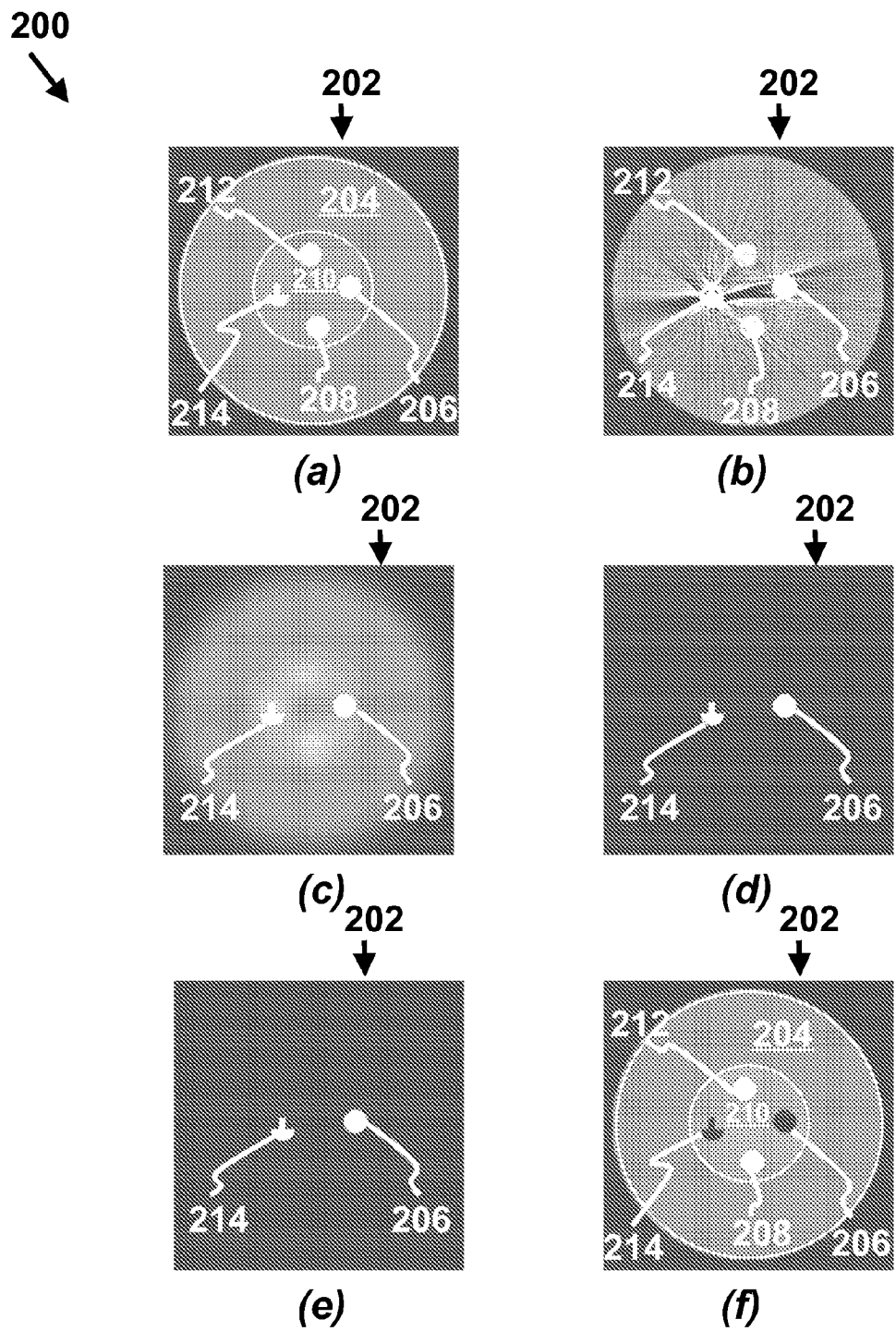
FIGS. 2a-2f show image results of the steps of determination of the shape and location of metal objects, according to one embodiment of the invention.

FIGS. 2a-2f show image results of the steps 200 of determining shapes and locations of metal objects, according one embodiment of the invention, where FIG. 2a shows a digital phantom 202, FIG. 2b shows the digital phantom reconstructed by the filtered back-projection (FBP) algorithm from the noise-contaminated projection. In these figures, implanted samples are provided that include aluminum 204, brass 206, bone 208 and iron 210, where an internal region is tissue 212, and an outer region is water 214. Severe streaking artifacts are presented in the reconstructed image shown in FIG. 2b. FIG. 2c shows the image reconstructed by the presented algorithm with parameters $\beta=1\times10^{10}$ and $\delta=0.1$ mm$^{-1}$.

It can be observed that only the brass 206 and iron 210 are preserved while the rest of structures of the phantom 202 are ignored by the reconstruction. The aluminum 204 is smoothed out because its linear attenuation coefficient is comparable to that of the bone 208. FIG. 2d shows the binary image extracted from FIG. 2c where the part corresponding to metal is set to 1 and the rest of image is set to 0.

To evaluate the accuracy of the localization and boundary of the metal and bone in the reconstructed image, the product of the binary image (FIG. 2d) and the digital phantom (FIG. 2b) is calculated, see FIG. 2e, and the product of the inverse of the obtained binary image and the digital phantom, see FIG. 2f. It can be observed that no background structure is included in FIG. 2e, suggesting that the obtained binary image is completely within the metal objects. In FIG. 2f, it is seen that no metal object is included in the background image and this observation indicates that all metal objects have been included in the obtained binary image. Combination of these two observations indicates the accuracy of the presented algorithm in obtaining the location and boundary of the embedded metals. The size of the phantom 202 shown in FIG. 2a is 350×350 pixels, and the pixel size is 1×1 mm². In this exemplary simulation, the projection data is generated according to a fan-beam CT geometry. The distance of source-to-axis is 100 cm and source-to-detector distance of 150 cm. The projection data of each view is 500 pixels and the size of detector element is 1 mm. Total 680 views are simulated over $2\pi$ rotation. At each energy level E, the ideal or noise-free line integral $\bar{p}(E)$ is calculated from the energy-dependent attenuation coefficients. The noisy measurement $I_i(E)$ is generated according to the following noise model:

$$I_i(E)=\text{Poisson}(I_0(E)\exp(-\bar{p}_i(E)))+\text{Normal}(0,\sigma_e^2), \quad (5)$$

where $I_0(E)$ is the incident X-ray photon number at energy level E and $\sigma_e^2$ is the background electronic noise variance which is chosen as 10 in the simulation study. The noisy line integral is calculated as:

$$p_i = \begin{cases} \ln\left(\frac{I_0}{I_i}\right) & I_i \geq T \\ \ln\left(\frac{I_0}{T}\right) & I_i < T \end{cases} \quad (6)$$

where $I_0$ and $I_i$ are the total incident photon number and exit photon number, respectively. T is a threshold to enforce that the logarithm transform is applied on positive numbers and it is chosen as 1 in this study.

An anthropomorphic head phantom 300 is used to illustrate the performance of one embodiment of the current invention. There exists a cubic empty space inside of the head phantom 300 designed for holding materials for dosimetric measurement. In the following examples, three different types of metallic objects embedded in a tissue-equivalent bolus are placed in the space, including: 1) 10 steel Ball Bearing (BB) of a diameter of 1.5 mm (see FIGS. 3a-3c); 2) three gold seeds of size 0.8×3 mm (see FIGS. 4a-4c); and 3) a brass triangular shape (see FIGS. 5a-5e). We then use two different sized metal nuts of regular hexagonal shape, where the known shape and geometry of the nut are used to measure the accuracy of presented algorithm quantitatively (see FIGS. 6a-6f). The nuts are first embedded in a bolus of 2 cm thick and then placed in a rectangular plastic container filled with water.

In these examples, the CT projection data are acquired by a Varian Acuity simulator. The number of projections for a full 360° rotation is 680. The dimension of each acquired projection image is 397 mm×298 mm, containing 1024×768 pixels. To save reconstruction time, the projection data at each projection view are downsampled by a factor of 2 and only 16 out of 768 projection data along the axial direction are used. The tube voltage is set to 125 kVp. The x-ray tube current is set at 80 mA and the duration of the x-ray pulse at each projection view is 25 ms. The distance of source-to axis is 100 cm and source-to-detector distance of 150 cm. The size of reconstructed image is 350×350×16 and voxel size is 0.776× 0.776×0.776 mm³.

Figure 3:
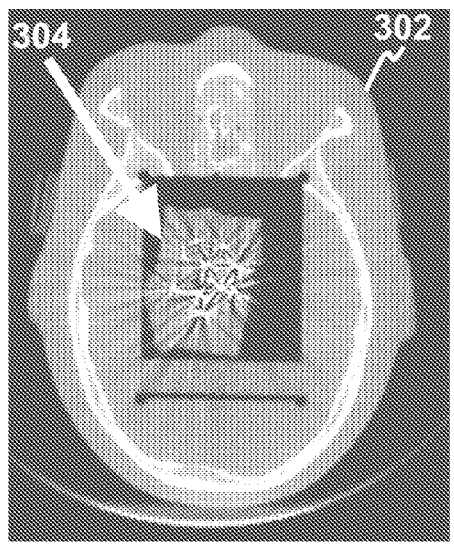
FIGS. 3a-3c show image results of the steps of a head phantom with ball bearings inserted therein, according to the current invention.
Figure 3:
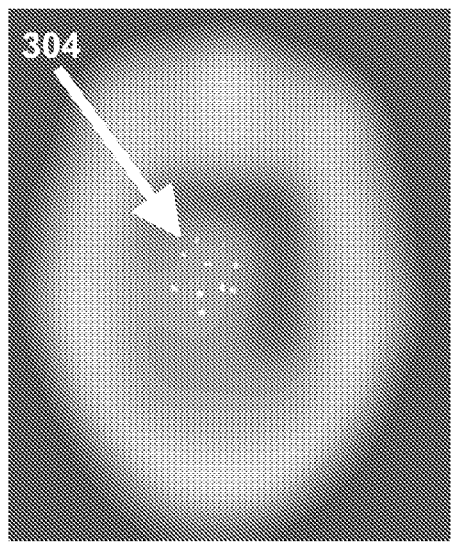
Figure 3:
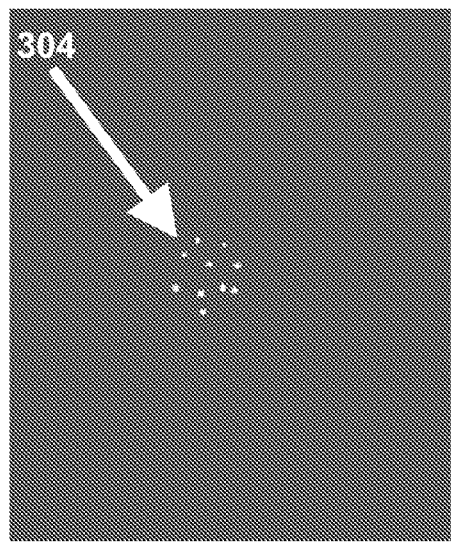

FIGS. 3a-3c illustrates the results 300 of the head phantom 302 with 10 steel ball bearings (BB) 304 inserted therein. FIG. 3(a) shows one slice of the image reconstructed by the FDK algorithm, according to one embodiment of the current invention. Strong artifacts caused by the BBs 304 are observed, which blurs the image and makes the identification of the BBs 304 difficult. FIG. 3(b) shows the image reconstructed by the current algorithm embodiment with parameters $\beta=1\times10^{10}$ and $\delta=0.02$ mm$^{-1}$. The 10 BBs 304 are clearly identified with the structure of the head 302 as background. The reconstructed BBs 304 show different sizes in FIG. 3b because the BBs 304 are not exactly on the same plane.

Figure 4:
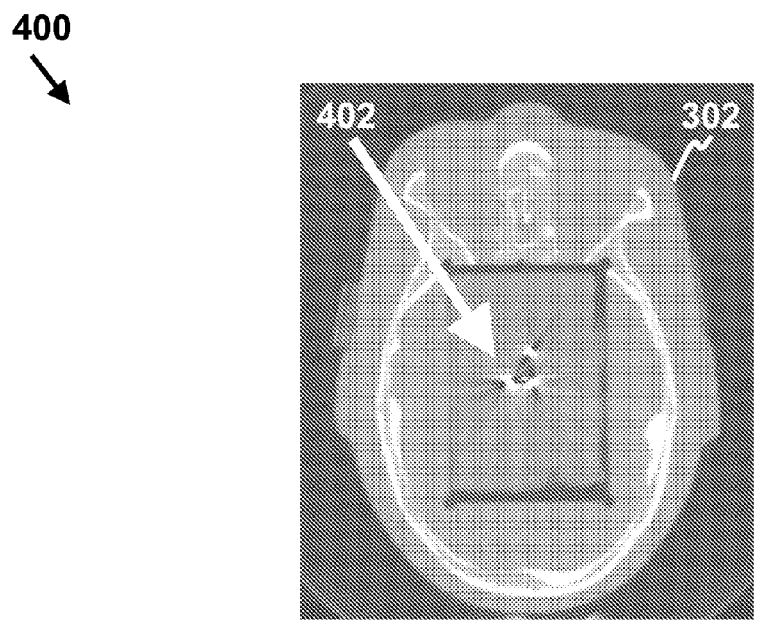
FIGS. 4a-4c show image results of the steps of a head phantom with golden seeds inserted therein, according to the current invention.
Figure 4:
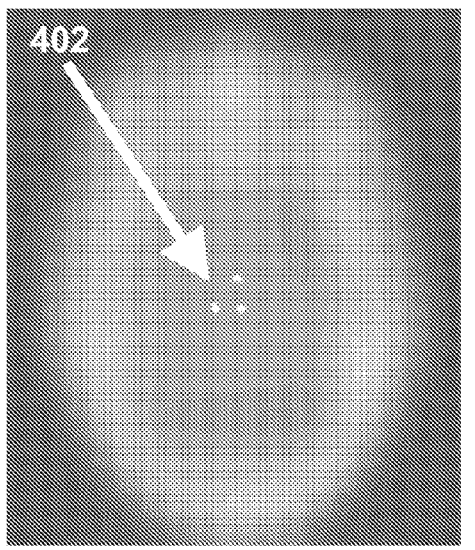
Figure 4:
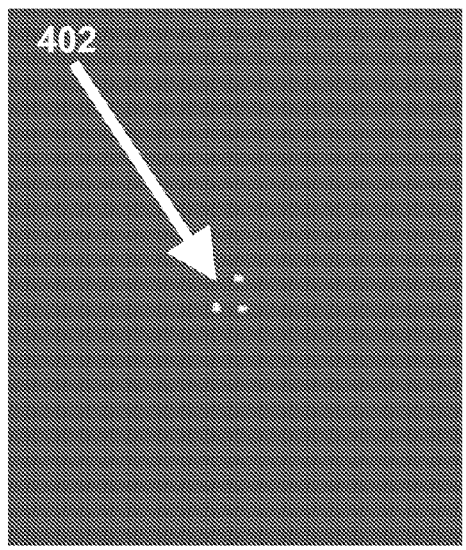

FIGS. 4a-4c show the gold seed results 400 of the head phantom 302 with three gold seeds 402 disposed therein, where the gold seeds 402 are commonly used in image-guided radiation therapy (IGRT). FIG. 4a shows the FDK-reconstructed image. Severe streaking artifacts make it difficult to locate the seeds accurately. However, in the image reconstructed by the gradient-controlled algorithm (see FIG. 4b), the location and edges of the golden seeds 400 are easily identified.

Figure 5:
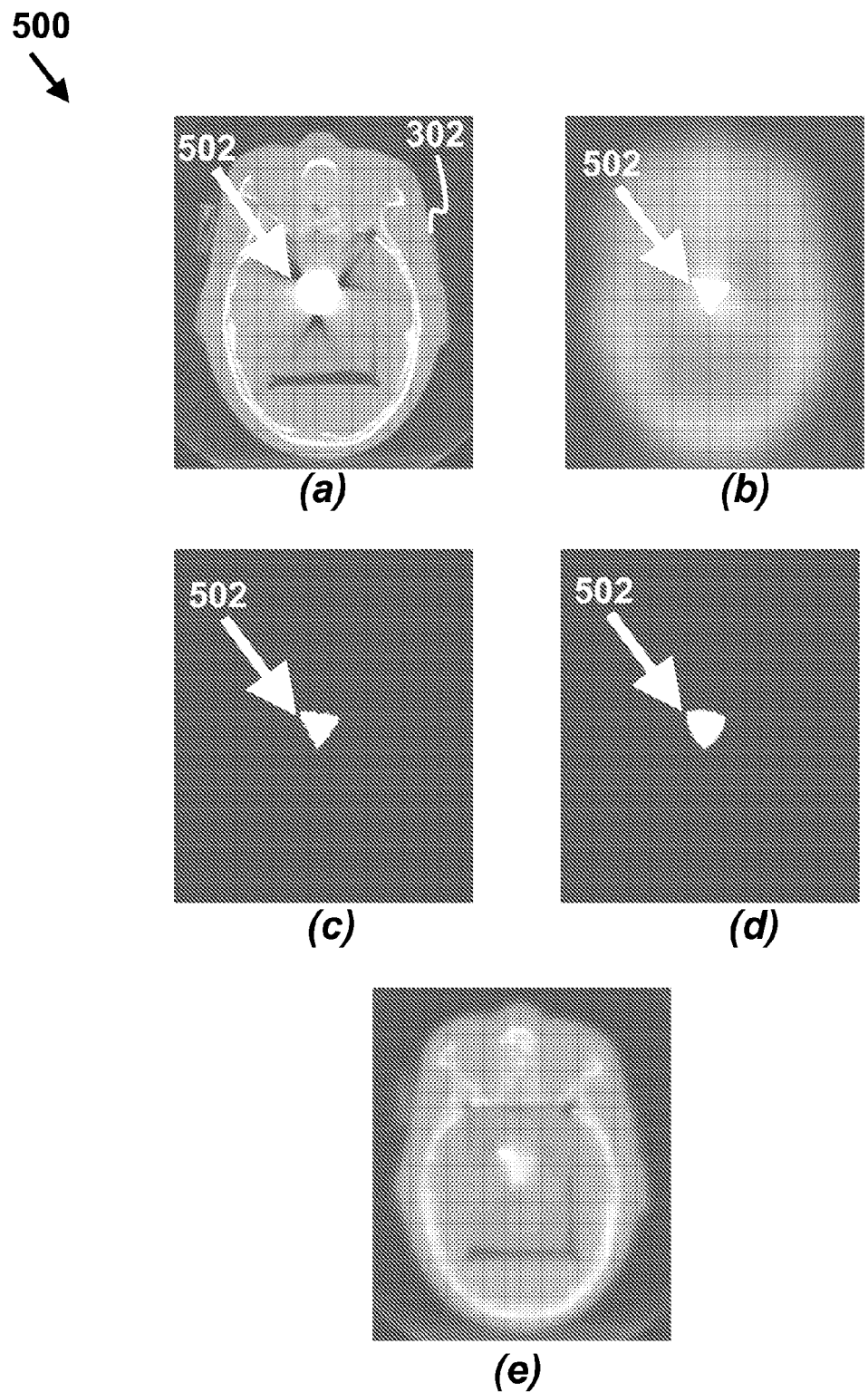
FIGS. 5a-5e show image results of the steps of a head phantom with triangularly shaped brass inserted therein, according to the current invention.
Figure 6:
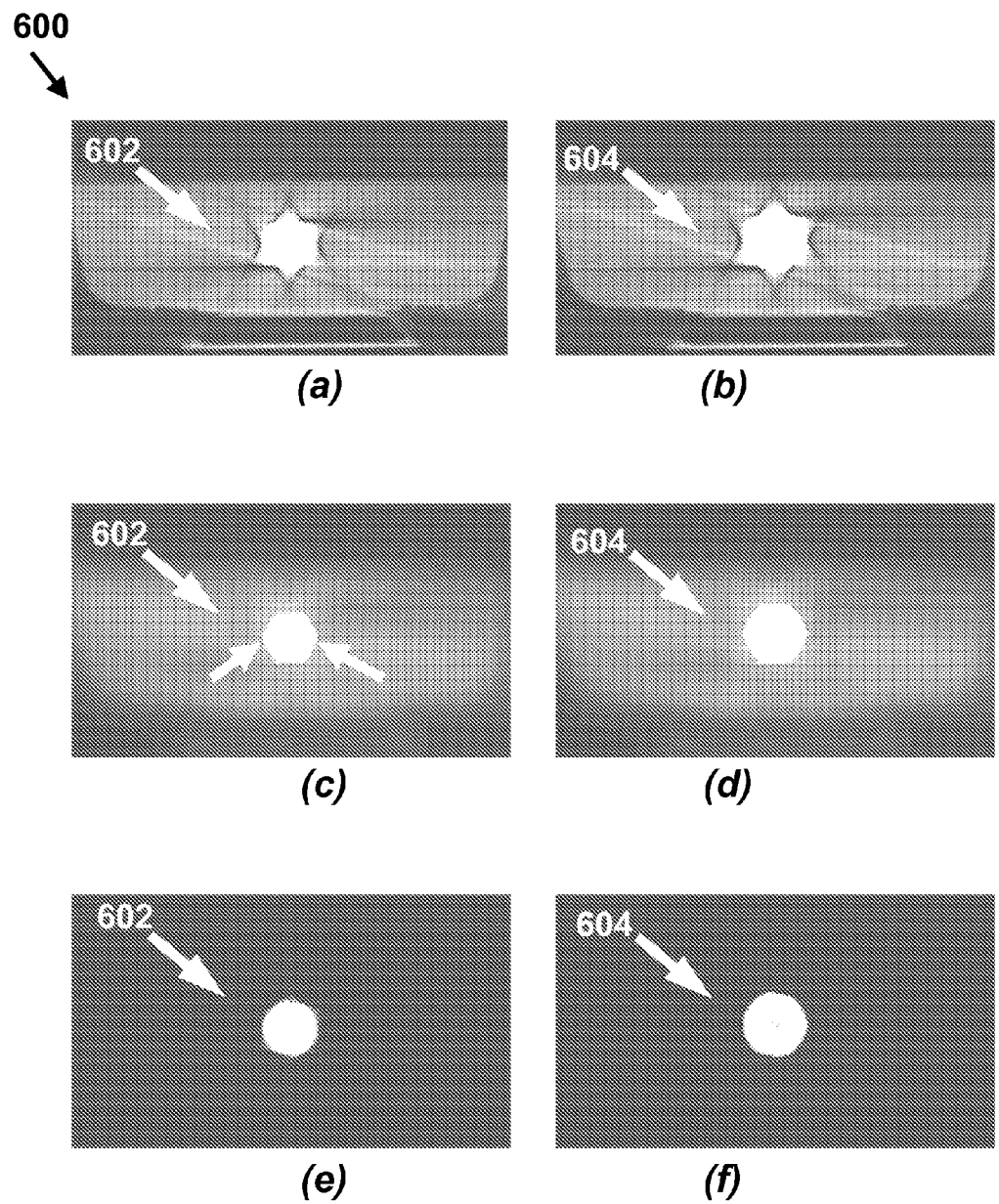
FIGS. 6a-6f show image results of the steps of head phantom with metallic nuts inserted therein, according to the current invention.

FIGS. 5a-5e show triangularly shaped brass results 500 of the head phantom with a triangularly shaped brass 502 embedded therein. FIG. 5a shows the FDK-reconstructed image, where severe artifacts are seen surrounding the brass. As a consequence of reconstruction artifacts, the shape of the reconstructed triangularly shaped brass 502 in the reconstructed image does not reflect the true geometry of the metal. FIG. 5b shows the image reconstructed by the method of the current invention and FIG. 5c shows the binary image extracted from FIG. 5b through thresholding. The boundary of the triangularly shaped brass 502 can be clearly delineated. The non-straight edge of the object in the reconstructed image is a reflection of the uneven boundaries of the triangularly shaped brass 502. FIG. 5d shows the triangularly shaped brass 502 extracted from the FDK reconstructed image of FIG. 5a by thresholding. It can be observed that the edge of the FDK-extracted metal does not truly represent the true shape of the triangularly shaped brass 502.

FIGS. 6a-6f show the metallic nut images 600 reconstructed by the FDK algorithm for a small nut 602 (½") and a large nut 604 (⅝"). The same images obtained using the algorithm described above are displayed in FIGS. 6a and 6b. Streaking artifacts are presented in the FDK-reconstructed images and the shapes of the nuts 602/604 are distorted from the actual objects. The metal objects extracted from FDK-reconstructed directly by thresholding (see FIGS. 6e and 6f) does not truly represents the actual shape of the nuts 602/604. In contrast, the geometry of the nuts 602/604 are found accurately in the gradient-controlled PWLS reconstruction. The reconstructed object appears massive because the nuts 602/604 are very dense and there is no photon transmitted through the nuts 602/604. The internal structure of the nuts 602/604 is not available when X-ray used for the CT scan is in the diagnostic energy range.

To quantitatively analyze the accuracy of the algorithm according to the invention, three dimensions, including (i) vertical distance between the top and bottom sides of a phantom, (ii) horizontal distance between two corners (indicated by arrows in FIG. 6c), and (iii) side length, are measured in the images reconstructed using the method of the current invention. The results are summarized in Table 1 along with the known geometry of the objects. The agreement between the gradient-controlled PWLS based reconstruction and the known dimensions is within 1 mm. The mean error of all measurements is 0.56 mm, which is comparable to the image voxel size of 0.776 mm.

TABLE 1

Comparison of the geometric dimensions of the gradient-controlled PWLS reconstructed objects and the known ground truth dimensions.

|  |  | I (mm) | II (mm) | III (mm) |
|---|---|---|---|---|
| ½" screw | actual Phantom | 24.5 | 26.0 | 14.0 |
|  | reconstructed image | 24.83 | 25.6 | 13.19 |
|  | Error | 0.33 | 0.40 | 0.81 |
| ⅝" screw | actual phantom | 28.5 | 31.5 | 16.0 |
|  | reconstructed image | 29.49 | 31.82 | 15.52 |
|  | Error | 0.99 | 0.32 | 0.48 |

A gradient-controlled algorithm based on the PWLS criterion has been described for localization of metallic objects in CT imaging. The objective of reconstruction according to the current invention is different from the conventional approaches. Instead of attempting to obtain the exact CT number for every voxel, which is hampered by insufficient projection data, the current invention focuses on reconstructing the interface between the metal objects and the surrounding tissues. The successful identification of the metal boundary here relies on two conditions: (1) the data is complete for the determination of the interface surface; and (2) distinct intensity gradient exists to differentiate the boundary points from other voxels. The PWLS algorithm of the invention allows one to take advantage of the two features of the problem and obtain the solution efficiently.

In the PWLS criterion, the edge of metal is preserved by incorporating image gradient information into the quadratic penalty term. By applying a strong regularization, i.e., choosing a large penalty parameter $\beta$, the term plays a dominant role during the reconstruction and provides an image emphasizing the metal objects and the remaining tissues as two different entities. The role of the data fidelity term in equation (1) is different from the conventional reconstruction. It provides rough estimates of the tissue density for thresholding and tissue-metal interface reconstruction. Generally, the difference of linear attenuation coefficients of metal and normal structures is much higher than that between normal structures. An image domain gradient threshold is thus effective to identify the interface during the reconstruction process. When a normal quadratic form penalty (see equation (2)) is used, the edge of metal will not be preserved. FIG. 5e shows the triangular brass image 502 reconstructed by the PWLS criterion with the normal quadratic penalty, where the edge of the metal is severely blurred.

In incorporating the gradient threshold into the constraint, an empirical parameter $\delta$ is introduced. The values of $\delta$ used in simulation and experimental studies are different, mainly because the difference in scatter signal in the two situations. No scatter is considered in the simulation. In contrast, the projection data in the experimental studies are contaminated by scatter, and the detected signal of the x-ray in the shadow region of a metal contains strong scattering contribution. Without removal of these scatter signals, this resulted an inconsistency between measured and calculated linear attenuations, in particularly in the shadow region of a metal object. A smaller threshold for the parameter $\delta$ is chosen to compensate for the scatter effect during the binary image reconstruction. In general, the final result is not very sensitive to the value of $\delta$, where a value of 0.02 for the $\delta$ yields satisfactory results for all three experimental studies.

By introducing the gradient-controlled regularization term of equation (3), the strength of the penalty depends on the current reconstructed value. This type of penalty introduces local minima and the results may depend on the initials. In the implementation of the current invention, the initial is the FDK/FBP reconstructed images. In all of the presented studies, the solution is converged to the expected images without any difficulty.

The importance of this invention lies in that it reveals, for the first time, that it is possible to accurately reconstruct the geometry of metal objects by using an edge-preserving algorithm for metal artifacts removal algorithm for CT imaging.

The presented method may find immediate applications in image guided interventional procedures where only the geometric information of the metal objects is required. For example, for accurate dose calculation in brachytherapy, the location and the shape of the implanted seeds in the patient coordinates is generally required. As demonstrated in FIGS. 3a-3c and FIGS. 4a-4c, the presented algorithm can readily find seed-like objects without worrying about the metal artifacts commonly seen in the conventional reconstruction techniques. Furthermore, the metal objects identified by the presented method can be projected onto the projection space via a forward projection, which provides a unique set of information for metal artifacts removal or reduction using some existing algorithms.

In conclusion, accurate localization of metals in the image space is a prerequisite for metal artifacts reduction and for various image guided interventions. In the current invention, an iterative image reconstruction algorithm based on the gradient-controlled PWLS has been developed to deal with the problem. Numerical simulation and experimental studies indicate that the invention is capable of accurately reconstructing the implanted metallic seeds and metal objects with complex shapes. Given that CT imaging is one of the most widely used imaging procedures in the clinics, successful implementation of the invention provides significant implications to routine patient care.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example using different penalty designs such as total variation of the image, generalized lp norm of the image, and other edge-preserving penalties. Another possible variation is to apply the invented gradient-controlled two-level penalty directly in the FBP-reconstructed image.

All such variations are considered to be within the scope and spirit of the present invention as defined by the following claims and their legal equivalents.

What is claimed:

1. A binary image reconstruction method to identify metal objects in a computer tomography (CT) image, comprising:
   a. providing a suitably programmed computer;
   b. providing a CT image, wherein said CT image comprises intensity data, wherein said suitably programmed computer is used to determine a first range of attenuation coefficient values and a second range of attenuation coefficient values in said intensity data, wherein when a difference between said first range of attenuation coefficient values and said second range of attenuation coefficient values is less than a pre-determined gradient threshold value a boundary of a metal object in said CT image is determined.

2. The binary image reconstruction method of claim 1, wherein said determination of said attenuation coefficient ranges comprises applying a penalized weighted least squares (PLWS) criterion to minimize an objective function, wherein said objective function comprises a data fidelity term and a regularization term, wherein said regularization term characterizes an a priori attenuation coefficient of said intensity data.

3. The binary image reconstruction method of claim 2, wherein said regularization term is only applied for adjacent data elements having a gradient value smaller than a predetermined threshold value, wherein when said regularization term is applied to said CT image comprising metal object data or tissue data a reconstructed output image shows only a metal object and a masked patient structure background.

4. The binary image reconstruction method of claim 1, wherein said first range of attenuation coefficient values is assigned a value of 0 and said second range of attenuation coefficient values is assigned a value of 1, wherein a region in said CT image where said attenuation coefficient values change from 0 to 1 comprises a boundary of a metal object in said CT image.

* * * * *